United States Patent
Allen-Ware et al.

(10) Patent No.: US 9,459,599 B2
(45) Date of Patent: Oct. 4, 2016

(54) DYNAMIC ADJUSTMENT OF OPERATIONAL PARAMETERS TO COMPENSATE FOR SENSOR BASED MEASUREMENTS OF CIRCUIT DEGRADATION

(71) Applicant: International Business Machines Corporation, Armonk, NY (US)

(72) Inventors: Malcolm S. Allen-Ware, Austin, TX (US); Alan J. Drake, Round Rock, TX (US); Michael S. Floyd, Cedar Park, TX (US); Tilman Gloekler, Gaertringen (DE); Charles R. Lefurgy, Austin, TX (US); Karthick Rajamani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 14/046,056

(22) Filed: Oct. 4, 2013

(65) Prior Publication Data
US 2015/0081039 A1 Mar. 19, 2015

Related U.S. Application Data

(63) Continuation of application No. 14/029,060, filed on Sep. 17, 2013.

(51) Int. Cl.
| | |
|---|---|
| *G05B 15/02* | (2006.01) |
| *G06F 11/16* | (2006.01) |
| *G05B 13/02* | (2006.01) |
| *G06F 11/00* | (2006.01) |

(52) U.S. Cl.
CPC .......... *G05B 13/024* (2013.01); *G06F 11/008* (2013.01)

(58) Field of Classification Search
CPC .... G05B 13/024; G06F 11/008; G06F 11/00
USPC .......................................... 700/9; 714/25–31
See application file for complete search history.

(56) References Cited

U.S. PATENT DOCUMENTS

| | | |
|---|---|---|
| 5,289,011 A | 2/1994 | Wong et al. |
| 6,760,068 B2 | 7/2004 | Petropoulos et al. |

(Continued)

OTHER PUBLICATIONS

Khan et al., "A Self-Adaptive System Architecture to Address Transistor Againg", IEEE, 2009, 6 pages.*

(Continued)

*Primary Examiner* — Robert Fennema
*Assistant Examiner* — Thomas Stevens
(74) *Attorney, Agent, or Firm* — Francis Lammes; Stephen J. Walder, Jr.; William J. Stock

(57) ABSTRACT

A mechanism is provided for implementing an operational parameter change within the data processing system based on an identified degradation. One or more degradations existing in the data processing system are identified based on a set of degradation values obtained from a set of degradation sensors. A determination is made as to whether one or more operational parameters need to be modified based on the one or more identified degradations. Responsive to determining that the one or more operational parameters need to be modified based on the one or more identified degradations, an input change is implemented to a one or more control devices in order that the one or more operational parameters are modified.

8 Claims, 4 Drawing Sheets

(56) References Cited

U.S. PATENT DOCUMENTS

| | | | |
|---|---|---|---|
| 7,129,800 | B2 | 10/2006 | Gauthier et al. |
| 8,018,260 | B2 | 9/2011 | Papageorgiou et al. |
| 9,117,011 | B2 * | 8/2015 | Berry et al. |
| 2002/0087904 | A1 | 7/2002 | Cai |
| 2006/0158263 | A1 | 7/2006 | Goldberg |
| 2010/0152910 | A1 | 6/2010 | Taft |
| 2011/0022866 | A1 | 1/2011 | Cai |
| 2011/0173432 | A1 | 7/2011 | Cher et al. |
| 2013/0002274 | A1 | 1/2013 | Saneyoshi et al. |
| 2014/0244212 | A1 * | 8/2014 | Allen-Ware et al. ......... 702/182 |
| 2014/0292355 | A1 | 10/2014 | Kenning |
| 2015/0277393 | A1 * | 10/2015 | Liu et al. ...................... 307/129 |

OTHER PUBLICATIONS

Kang, Kunhyuk et al., "NBTI Induced Performance Degradation in Logic and Memory Circuits: How Effectively Can We Approach a Reliability Solution?", IEEE, 2008, pp. 726-731.

Kim, Tae-Hyoung , "Silicon Odometer: An On-Chip Reliability Monitor for Measuring Frequency Degradation of Digital Circuits", IEEE Journal of Solid-State Circuits, vol. 43, No. 4, Apr. 2008, pp. 874-880.

Lu, Pong-Fei et al., "A built-in BTI monitor for long-term data collection in IBM microprocessors", 2013 IEEE International Reliability Physics Symposium (IRPS), Anaheim, California, Apr. 14-18, 2013, pp. 4A.1.1-4A1.6.

Mintarno, Evelyn et al., "Optimized Self-Tuning for Circuit Aging", European Design Automation Association (EDAA'2010), 2010, 6 pages.

Singh, Prashant , "On-chip NBTI and gate-Oxide_Degradation Sensing and Dynamic Management in VLSI circuits", Dissertation, The University of Michigan, 2011, 120 page.

Tiwari, Abhishek et al., "Facelift: Hiding and Slowing Down Aging in Multicores", 41st IEEE/ACM International Symposium on Microarchitecture (MICRO-41), http://iacoma.cs.uiuc.edu/iacoma-papers/micro08_facelift.pdf, Nov. 8-12, 2008, pp. 129-140.

U.S. Appl. No. 14/029,060.

* cited by examiner

DYNAMIC ADJUSTMENT OF OPERATIONAL PARAMETERS TO COMPENSATE FOR SENSOR BASED MEASUREMENTS OF CIRCUIT DEGRADATION

BACKGROUND

The present application relates generally to an improved data processing apparatus and method and more specifically to mechanisms for dynamic adjustment of operational parameters to compensate for sensor based measurements of circuit degradation.

Integrated circuit designers plan for the aging or power-on hours (POH) of silicon in integrated circuit devices based on modeling various degradations to the silicon with degradation dependent on, for example, unique characteristics that arise from manufacturing, such as effective gate conductor length (Lpoly) of critical circuits for a given chip or wafer (L) and a magnitude coefficient that varies by wafer or lot (A), and run-time operational characteristics experienced by the silicon, such as junction temperature (T), frequency of operation (F), which is often augmented by a generic switching factor assumption (FR), and voltage of operation (Vds).

Degradation caused by voltage of operation (Vds) or biasing of the voltage of operation (Vds) in aging circuits may cause an increase in threshold voltage that further lowers performance over time. That is, the increased threshold voltage changes the timing guard band and guard band protection circuits (such as the critical path monitor (CPM) circuit, RAZOR circuit, or the like), which normally detect the timing guard band, may not detect this degradation because the guard band protection circuits do not age at the same rate as typical circuits. Thus, traditional product approach to compensating for degradation over silicon lifetime is to set a voltage of operation and/or a frequency of operation based on end-of-life timing margins.

SUMMARY

In one illustrative embodiment, a method, in a data processing system, is provided for implementing an operational parameter change within the data processing system based on an identified degradation. The illustrative embodiment identifies one or more degradations existing in the data processing system based on a set of degradation values obtained from a set of degradation sensors. The illustrative embodiment determines whether one or more operational parameters need to be modified based on the one or more identified degradations. The illustrative embodiment implements an input change to a one or more control devices in order that the one or more operational parameters are modified in response to determining that the one or more operational parameters need to be modified based on the one or more identified degradations.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide retuning operational parameters based on active degradation measurements using available sensors such as frequency, voltage, throttling, timing-margin offsets, or the like, individually or in combination. Again, traditional product approach to compensating for degradation over silicon lifetime is to set a voltage of operation and/or a frequency of operation based on end-of-life timing margins. Thus, during calibration of a data processing system, an initial degradation reading/value is obtained from each degradation sensor in the data processing system. Then, after calibration of the data processing system and at predetermined intervals, a subsequent degradation reading/value is obtained from each degradation sensor in the data processing system. Based on the initial degradation values and the subsequent degradation values, the mechanisms of the illustrative embodiments determine, for each degradation sensor, a degradation change value is determined between the subsequent degradation value and the initial degradation value. Furthermore, the determined degradation change value is compared to a target degradation value in order to obtain a lifetime degradation change value. Utilizing the lifetime degradation change value, the mechanisms of the illustrative embodiments identify one or more operation values to modify in order to compensate for the degradation shifts.

Figure 1:
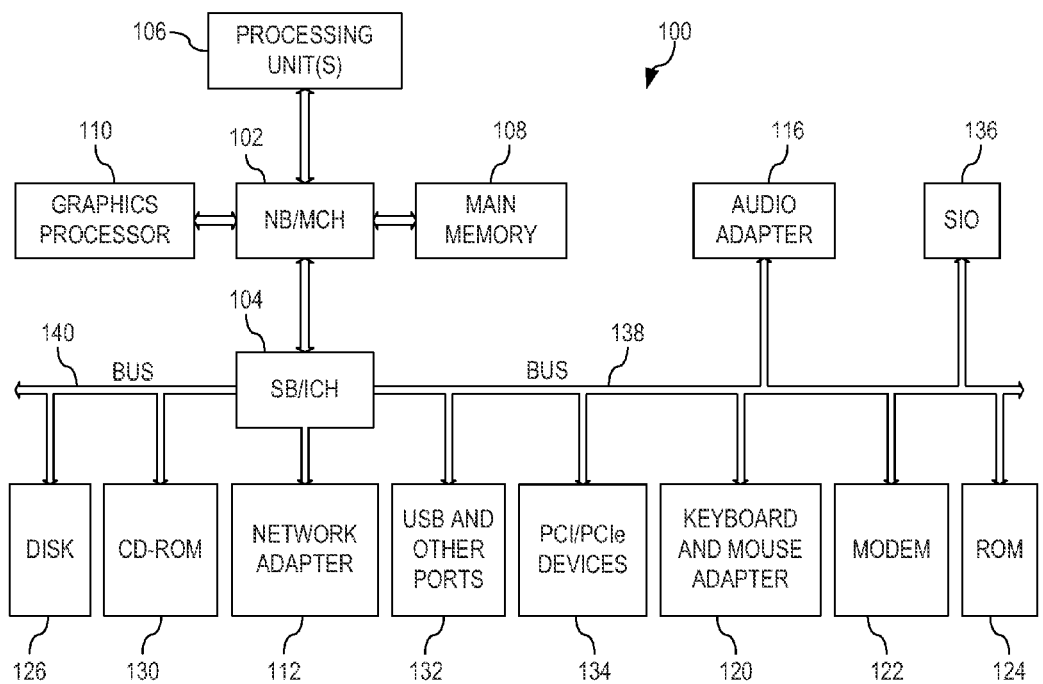
FIG. 1 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System p® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Again, the illustrative embodiments provide for retuning end-of-life (EOL) timing margins based on active degradation measurements using available control knobs such as frequency, voltage, throttling, timing-margin offsets, or the like, individually or in combination. The illustrative embodiments introduce a degradation control mechanism that may modify one or more operational values to compensate for degradation shifts based on degradation change values determined between a first degradation value and a subsequent degradation value. The degradation control mechanism may compensate for degradation shifts by changing one or more operational parameters. For example, the degradation control mechanism may compensate for degradation shifts by introducing delays via a critical path monitor (CPM) circuit to a digital phase locked loop (DPLL) so that an effective frequency from the DPLL is lowered, by reducing the calibration delay step size to the CPM in order to adjust the effective frequency, by utilizing degradation change values to offset a voltage regulator module thereby increasing the timing margins, or the like.

The degradation change values may be for transistor threshold voltage (Vt), sub-threshold slope (SS), transconductance (gm), or the like, which degrade in a continuous fashion, such as negative bias temperature instability (NBTI), positive bias temperature instability (PBTI), hot carrier injection (HCI), stress induced leakage current (SILC), time dependent dielectric breakdown (TDDB), (PCCA), or the like. PCCA refers to the PC and CA layers in our processing mask step. PC is the metal used to form transistor gates and CA is the metal used to connect wiring metal layers to the PC gate metal and to the transistor source and drain. There is a special degradation at these levels of the dielectric that isolates wires, gates, connection vias, or the like.

Figure 2:
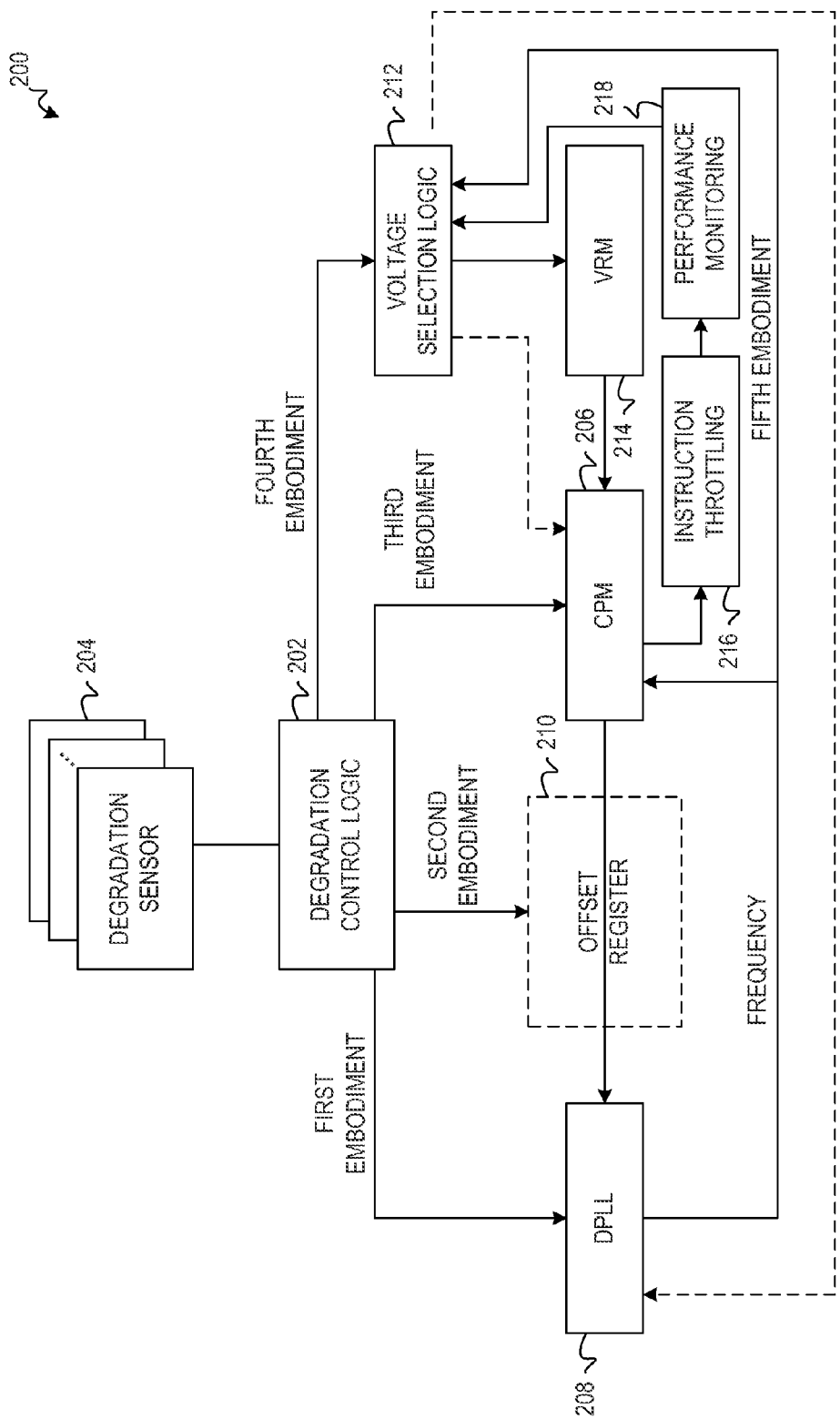
FIG. 2 depicts a functional block diagram of a degradation control mechanism within a data processing system in accordance with an illustrative embodiment.

FIG. 2 depicts a functional block diagram of a degradation control mechanism within a data processing system in accordance with an illustrative embodiment. Data processing system 200 comprises degradation control logic 202, degradation sensors 204, critical path monitor (CPM) circuitry 206, digital phase locked loop (DPLL) 208, instruction throttling mechanism 216, and performance monitoring mechanism 218. During calibration of data processing system 200, degradation control logic 202 obtains an initial degradation reading/value from each of degradation sensors 204. Then, as data processing system 200 is placed into production and at a first end to a predetermined interval, degradation control logic 202 obtains a current degradation reading/value from each of degradation sensors 204.

For each of degradation sensors 204, degradation control logic 202 sets Deg0 to the initial degradation value and sets Deg1 to the current degradation value. Degradation control logic 202 then determines a measured change in degradation value ($\Delta deg_{measured}$) by determining the difference between Deg1 value and Deg0 value. Degradation control logic 202 then determines whether the $\Delta deg_{measured}$ value is greater than or equal to zero. If the $\Delta deg_{measured}$ value is greater than or equal to zero, degradation control logic 202 determines whether the $\Delta deg_{measured}$ value causes the change in degradation (i.e., a scale degradation factor) to be greater than or equal to control degradation value (i.e., a control factor) using the following equation:

$$\Delta deg_{measured} \frac{\Delta OP}{\text{per-unit degradation}} \geq \frac{\Delta OP}{bitcontrol} \text{control\_step\_function}$$

where the $\Delta deg_{measured}$ value is the measured change in degradation value, $\Delta OP$/per-unit degradation is the change in an operating point of the processor (e.g., voltage, frequency, or the like) for a given unit of the degradation sensor, $\Delta OP$/bitcontrol is the change in an operating point for a unit step change in the control setting for that operating point controller, and control_step_function is the step function used to determine the way the control is changed due to degradation.

A degradation sensor may provide a measurement in a unit different from the control parameter. $\Delta OP$/per-unit degradation is a scale degradation factor used to convert the degradation sensor output to the current operating point control. For example, the sensor may output a percent of total degradation but the control parameter is voltage. So the change in voltage per unit of measurable degradation ($\Delta OP$/per-unit degradation) is used to scale each sensor output to a voltage change. $\Delta OP$/bit control is the minimum change in the operating point for a minimum step size of the control variable, for example, voltage change per step of voltage controller. The control_step_function is used to modify the base rate of change. If this value is 1, then response is linear to degradation. But degradation is non-linear and it may be advantageous to make control_step_function a function itself. For example, degradation is non-linear: that is, degradation is fast early in life and slow at end of life. Control_step_function could also be a function that has larger steps early in the life of the device that decreases with lifetime since smaller adjustments are needed later in the life of the device. This control function could also work with a geometric pattern where it is n early in life, 2n after time t, 4n after time 2t, etc. The function will depend on the way degradation is measured, how it accumulates over time, and the way the operating point responds to degradation. A linear degradation and a linear response would use a linear control_step_function for best results. A step function where control_step_function is 1 and where $\Delta OP$/bit control is a small fraction of the operating point (ie., the frequency can be adjusted in very small steps) will accurately approximate a non-linear degradation if the sample time of the controller is much smaller than the time constant of the degradation.

If degradation control logic 202 determines that the scale version of the measured degradation (called scale degradation factor here) is greater than or equal to the control factor, then degradation control logic 202 determines an increment value to increment an operational parameter of data processing system 200 utilizing the following equation:

$$\text{Increment} = \Delta deg_{measured} \frac{\Delta OP}{\text{per-unit degradation}} \times \frac{bitcontrol}{\Delta OP} \times \text{control\_step\_function}$$

where the $\Delta deg_{measured}$ value is the measured change in degradation value, $\Delta OP$/per-unit degradation is the change in an operating point of the processor (e.g., voltage, frequency, or the like) per unit of degradation sensor output, bitcontrol/$\Delta OP$ is the per-unit change in control divided by the unit change in operating point, and control_step_function is a scaling function used to match the degradation to the control mechanism. The use of the increment value by degradation control logic 202 will be described in detail below.

Degradation control logic 202 then sets Deg0 equal to Deg1 and waits for the next end to a predetermined interval to obtain a new Deg1 value, where the process is repeated. If degradation control logic 202 determines that the scale degradation factor is less than the control factor, then degradation control logic 202 does nothing to Deg0 and waits for the next end to a predetermined interval to obtain a new Deg1 value, where the process is repeated.

Returning to degradation control logic 202 determining whether the $\Delta deg_{measured}$ value is greater than or equal to zero, if the $\Delta deg_{measured}$ value is less than zero, degradation control logic 202 determines whether the absolute value of the negative change in degradation value ($-\Delta deg_{measured}$) value causes the change in degradation (i.e., a scale degradation factor) to be greater than or equal to control degradation value (i.e., a control factor) using the following equation:

$$\left| -\Delta deg_{measured} \frac{\Delta OP}{\text{per-unit degradation}} \right| \geq \frac{\Delta OP}{bitcontrol} \text{control\_step\_function}$$

where the $-\Delta deg_{measured}$ value is the negative measured change in degradation value, $\Delta OP$/per-unit degradation is the change in an operating point of the processor (e.g., voltage, frequency, or the like) for a given unit of the degradation sensor, $\Delta OP$/bitcontrol is the change in an operating point for a unit step change in the control setting for that operating point controller, and control_step_function is the step function used to determine the way the control is changed due to degradation.

If degradation control logic 202 determines that the absolute value of the scale degradation factor is greater than or equal to the control factor, then degradation control logic 202 determines a decrement value to decrement the operational parameter of data processing system 200 utilizing the following equation:

$$\text{Decrement} = -\Delta deg_{measured} \frac{\Delta OP}{\text{per-unit degradation}} \times \frac{bitcontrol}{\Delta OP} \times \text{control\_step\_function}$$

where the $-\Delta deg_{measured}$ value is the negative measured change in degradation value, $\Delta OP$/per-unit degradation is the change in an operating point of the processor (e.g., voltage, frequency, or the like) per unit of degradation sensor output, bitcontrol/$\Delta OP$ is the per-unit change in control divided by the unit change in operating point, and control_step_function is a scaling function used to match the degradation to the control mechanism. The use of the decrement value by degradation control logic 202 will be described in detail below.

Degradation control logic 202 then sets Deg0 equal to Deg1 and waits for the next end to a predetermined interval to obtain a new Deg1 value, where the process is repeated. If degradation control logic 202 determines that the absolute value of the scale degradation factor is less than the control factor, then degradation control logic 202 does nothing to Deg0 and waits for the next end to a predetermined interval to obtain a new Deg1 value, where the process is repeated.

The following is an example of the above process. Assume that the output of a degradation sensor 204 uses a unit that is not the same as the operating point control mechanism, then some amount of scaling needs to be performed. Degradation control logic 202 implements scaling of the degradation sensor output to some number of steps of the actuation mechanism and moves that number of steps. In accordance with this illustrative embodiment, degradation sensor 204 has an output from 0 to 1 where 0 is no degradation and 1 is maximum allowed degradation.

If, as an example, where the actuation mechanism is frequency control, an initial degradation reading, Deg0, is 0.5 and a next reading, Deg1, is 0.6, then $\Delta deg$ is equal to 0.1. The maximum change in frequency allowed due to degradation is 5% of 4 GHz. So the change in frequency per degradation is 0.05*4e9/1=200 MHz. The 1 in the denominator is the change in degradation sensor allowed during the lifetime and the numerator is the change in frequency allowed during the lifetime. So the degradation of the last reading is 0.1*200 MHz=20 MHz. The frequency actuation (by adjusting CPM calibration) is 40 MHz/CPM step. Since 20 MHz<40 MHz, no change is implemented. On the next reading, Deg1 is 0.7, so $\Delta deg$ is now 0.2 because the previous interval did not change Deg0. The scaled frequency change is 0.2*200 MHz=40 MHz. This equals 40 MHz/CPM step, so a 1 CPM step is implemented and Deg0 is set to Deg1 (0.7) and the next cycle is started. If the next reading Deg1 had equaled 1, that would be a change of 0.5 requiring 100 MHz of adjustment. Thus, degradation control logic 202 may step by one step (linear adjustment), three steps (scaled adjustment based on rounding up 100/40), or some other scaled measure. To enable single-step actuation, it is important that the sampling period of the degradation sensor be much less than the time constant of the degradation mechanism.

If, as an example, where the actuation mechanism is voltage control, such voltage control would work similarly to the frequency control. Again, the total degradation is 0 to 1 from the sensor. The allowed voltage margin is 5% of 1V, or 50 mV. The scale degradation factor from degradation to voltage is 500 mV/1. The actuation mechanism is 10 mV/step. If Deg0 is 0.5 and Deg1 is 0.6, the voltage change needed is 0.1*50 mV=5 mV. This is less than 10 mV, so no change is made. If on the next reading Deg1 is 0.7, then the voltage change is 0.2*50 mV=10 mV and degradation control logic 202 implements a change.

The general idea is that degradation sensor 204 may have a number of possible outputs and degradation control logic 202 may implement a change in frequency, a change in voltage, a change in delay, a scaled number, etc. Thus, the above equations are used to take a sensor output and convert them to the needed number of changes for the control mechanism. For both of the above, CPM 206 may provide the adjustment, DPLL 208 may provide the adjustment, VRM 214 may provide the adjustment, or some combination of controls as is demonstrated. Degradation sensor 204 may also scale its output itself; for example, provide a frequency change caused by degradation. Thus, many changes may be implemented in addition to these examples without departing from the spirit and scope of the invention.

Degradation control logic 202 performs the process for all of degradation sensors 204 in the predetermined time interval and, once all determinations have been performed, degradation control logic 202 may determine a worst case from each of the determinations, so that a "worst" case determination is selected as the change for that time period to be implemented to either increase or decrease the operational parameter of data processing system 200. Alternatively, degradation control logic 202 may determine an average change value from all of the determinations, so that the average change value is implemented to either increase or decrease the operational parameter of the data processing system 200. As another alternative, in an independently operating multi-processor system or in an independently operating multi-core system, degradation control logic 202 may determine how the operational parameter each processor or each processor core is to be increased or decreased based on the degradations associated with that processor or processor core.

Based on the determination to increment the operational parameter, decrement the operational parameter, or to take no action for the current predetermined interval, the illustrative embodiments provide numerous different methods to implement the operational parameter change, if necessary. In accordance with a first illustrative embodiment, degradation control logic 202 may implement a direct modification to DPLL 208 by either incrementing or decrementing one or more frequency divider values, changing a multi integral (mult_int) value, changing a multi fractional (mult_frac) value, or the like within DPLL 208, which in turn adjusts the output or operational frequency of data processing system 200. That is, for example, based on a signal from degradation control logic 202, DPLL 208 may adjust a control on the voltage controlled oscillator which changes the output frequency. This is a direct control and has limited resolution. As another example, based on a signal from degradation control logic 202, DPLL 208 may adjust parameters that are used to average the current frequency over time to determine the error to the set frequency. This may provide a finer control since the averaging allows for smaller frequency adjustments.

In accordance with a second illustrative embodiment, offset register 210 may be inserted in between CPM 206 and DPLL 208. With the implementation of offset register 210, degradation control logic 202 may induce one or more increment or decrement signals so that the effective operational frequency output by DPLL 208 is either higher or lower, respectively. That is, DPLL 208 utilizes a 5 bit signal from CPM 206 to control the frequency that is output from DPLL 208, where the normal signal value is "11100." In order to slow down the output frequency, degradation control logic 202 may induce one or more decrement signals, "11000", out of n samples during a period of time. This makes CPM 206 reading more pessimistic during the n samples and slows down the frequency. In order to speed up the output frequency, degradation control logic 202 may induce one or more increment signals, "11110", of n samples during a fixed period of time which makes CPM 206 reading more optimistic and speeds up the DPLL.

In accordance with a third illustrative embodiment, degradation control logic 202 may implement a direct modification to CPM 206. Again, CPM 206 is circuitry that sends a signal/code to DPLL 208. Rather than modifying the signal output by CPM 206 after CPM 206 sends the signal as in the previous illustrative embodiment, in this embodiment, degradation control logic 202 modifies the calibration of CPM 206 based on the determined increment value or decrement value. That is, in order to slow down the operational frequency of data processing system 200, degradation control logic 202 may offset the calibration of CPM 206 by adding delay. Further, in order to speed up the operational frequency of data processing system 200, degradation control logic 202 may offset the calibration of CPM 206 by removing delay. The output of CPM 206 is a measure of the cycle time as a function of the system clock of data processing system 200. By adding calibration delay, CPM 206 effectively instructs data processing system 200 that more cycle time is needed which causes a clock slowdown. By removing calibration delay, CPM 206 effectively instructs data processing system 200 that less cycle time is needed which causes the clock frequency to increase.

In accordance with a fourth illustrative embodiment, degradation control logic 202 may implement a direct modification to voltage selection logic 212 which drives voltage regulator module (VRM) 214. In this embodiment, degradation control logic 202 converts the degradation into a voltage regulator setting adjustment. For example, VRM 214 may conform to the Voltage Regulator Module (VRM) and Enterprise Voltage Regulator-Down (EVRD) 11.1 specification by Intel® which converts an 8-bit input into a voltage. The adjustment would be added to the normal voltage selected by voltage selection logic 212. Since voltage selection logic 212 is ideally selecting a voltage to maintain a frequency target, any adjustment to voltage would be undone in the next control period. Therefore, instead of directly adjusting the voltage, voltage selection logic 212 will convert the voltage adjustment from degradation control logic 202 into a CPM calibration adjustment and forward the adjustment to CPM 206 (dotted line in FIG. 2). For example, assuming a fixed-frequency target, a degradation will be converted into a positive (higher) voltage adjustment. This voltage adjustment will be converted to a CPM calibration that instructs DPLL 208 to run slower. The effect of a slower DPLL 208 will be that voltage selection logic 212 raises the voltage setting of VRM 214 to increase the frequency to the target frequency.

As a supplement to all of these illustrative embodiments, in addition to degradation control logic 202 changing the operational frequency either through the DPLL 208, CPM 206, or voltage selection logic 212 and VRM 214, degradation control logic 202 may also implement one or more of workload balancing. That is, if the $\Delta\text{deg}_{measured}$ value is greater than an upper predetermined threshold, then degradation control logic 202 may shift work off of the chip associated with the particular degradation sensor 204. Further, if the $\Delta\text{deg}_{measured}$ value is less than a lower predetermined threshold, then degradation control logic 202 may increase the workload of the chip associated with the particular degradation sensor 204. If the $\Delta\text{deg}_{measured}$ value is between the upper predetermined threshold and the lower predetermined threshold, then degradation control logic 202 may not shift any workload with regard to the chip associated with the particular degradation sensor 204.

In a fifth embodiment, degradation control logic 202 may implement a direct modification to CPM 206. However, if there is an insufficient timing margin as measured by CPM 206, then CPM 206 may throttle the instructions via instruction throttling mechanism 216 since CPM 206 may not be able to alter the load on the regulator by lowering the DPLL frequency. Anytime instruction throttling mechanism 216 is throttling instructions, voltage selection logic 212 will increase the voltage by the smallest step size possible, e.g., 6.25 mVolts until there is no throttling measured. When no throttling is measured, performance monitoring mechanism 218 sets a count-down timer to a predetermined value T. When the count-down timer reaches 0, voltage selection logic 212 reduces the voltage by the smallest step size, e.g. 6.25 mVolts, but clipped by a Vmin that is set by the data processing system 200. The Vmin is the minimum acceptable voltage below which the instruction throttling path could no longer compensate for voltage droop from di/dt events that could lead to a timing failure. The Vmin is required because the instruction throttling may only compensate so much for timing margin, and if the voltage is allowed to go too low, there could be a sudden burst of instructions that CPM 206 may not be able to compensate for at the lower than Vmin value.

Finally, in all these illustrative embodiments, the implemented change in operating point may be a linear step, single step, proportional step, integrated step, or some other function. That is, when a step change is detected, degradation control logic 202 may simply do a single increment of the control structure that causes an actuation of the operating point larger than the degradation. Alternatively, degradation control logic 202 may scale the control to match or exceed the degradation. For example, degradation of some processes such as NBTI is non-linear: very large early in life and smaller as the device ages. The control mechanism can be scaled for larger compensating steps early in the life of the device with steps getting smaller as the device ages. As another alternative, degradation control logic 202 may keep an average of the degradation values and only step if n successive values of Deg1 exceed the control threshold or if the average of n successive values of Deg1 exceed the threshold. In accordance with the illustrative embodiment, degradation control logic 202 uses a stability of the sensor to determine which method is appropriate.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
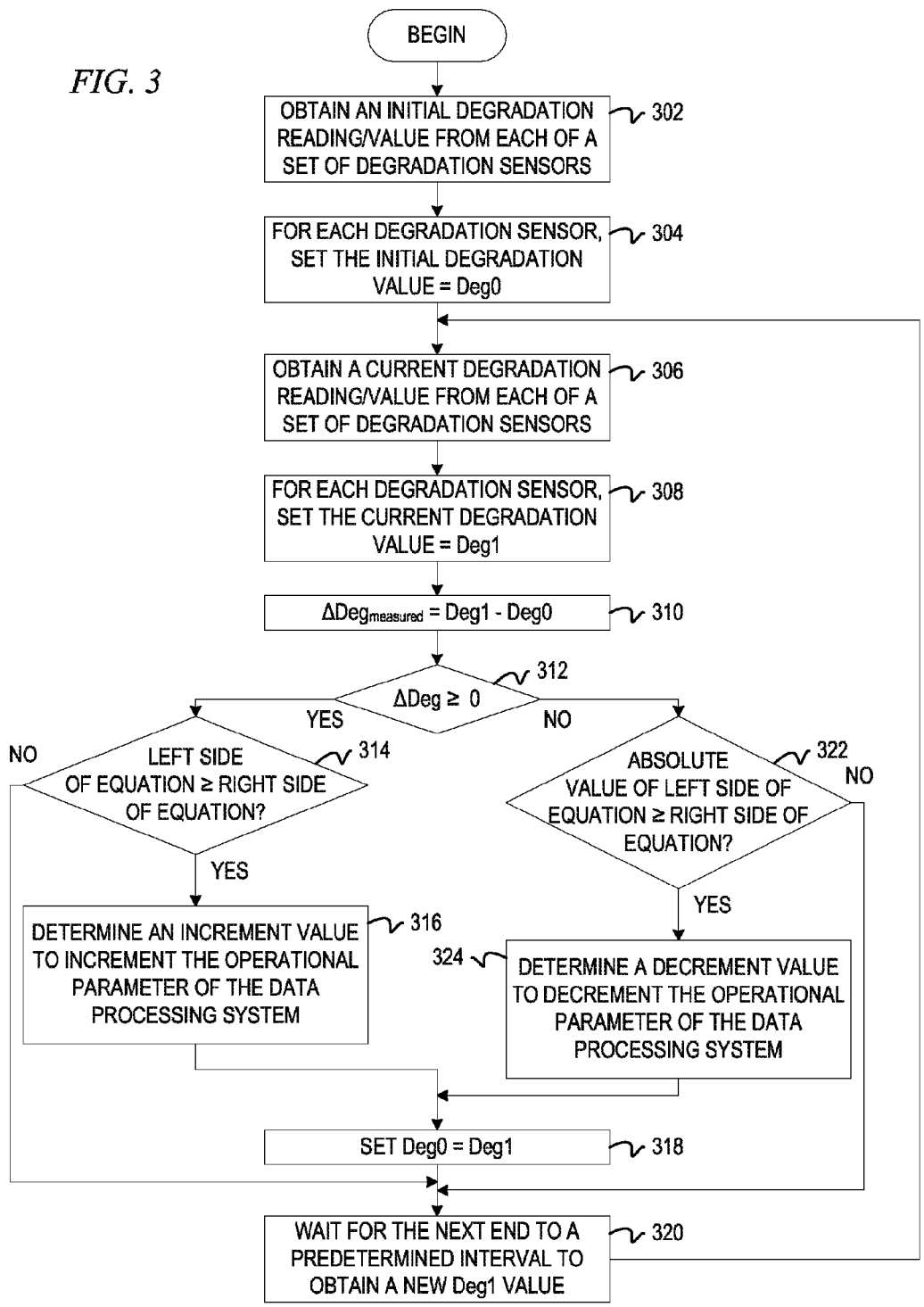
FIG. 3 depicts a flow diagram of the operation performed by a degradation control mechanism in determining a change in operational parameter within a data processing system in accordance with an illustrative embodiment.

FIG. 3 depicts a flow diagram of the operation performed by a degradation control mechanism in determining a change in operational parameter within a data processing system in accordance with an illustrative embodiment. As the operation begins, during calibration, the degradation control mechanism obtains an initial degradation reading/value from each of a set of degradation sensors in the data processing system (step 302). For each degradation sensor in the set of degradation sensors, the degradation control mechanism sets the initial degradation value equal to a value of Deg0 (step 304), it may also store the initial value in a permanent location to provide an absolute measure of degradation since beginning of the life of the device. Then, as the data processing system is placed into production and/or at a first end to a predetermined interval, the degradation control mechanism obtains a current degradation reading/value from each of the set of degradation sensors (step 306) and sets the current degradation value equal to a value of Deg1 (step 308).

The degradation control mechanism then determines a change in degradation value ($\Delta deg_{measured}$) by determining the difference between Deg1 value and Deg0 value (step 310). The degradation control mechanism determines whether the $\Delta deg_{measured}$ value is greater than or equal to zero (step 312). If at step 312 the $\Delta deg_{measured}$ value is greater than or equal to zero, the degradation control mechanism determines whether the $\Delta deg_{measured}$ value causes the change in degradation (i.e., a scale degradation factor) to be greater than or equal to control degradation value (i.e., a control factor) (step 314) using the following equation:

$$\Delta deg_{measured} \frac{\Delta OP}{\text{per-unit degradation}} \geq \frac{\Delta OP}{\text{bitcontrol}} \text{control\_step\_function}$$

where the $\Delta deg_{measured}$ value is the measured change in degradation value, $\Delta OP$/per-unit degradation is the change in an operating point of the processor (e.g., voltage, frequency, or the like) for a given unit of the degradation sensor, $\Delta OP$/bitcontrol is the change in an operating point for a unit step change in the control setting for that operating point controller, and control_step_function is the step function used to determine the way the control is changed due to degradation.

If at step 314 the degradation control mechanism determines that the scale degradation factor is greater than or equal to the control factor, then the degradation control mechanism determines an increment value to increment the operational parameter of the data processing system (step 316) utilizing the following equation:

$$\text{Increment} = \Delta deg_{measured} \frac{\Delta OP}{\text{per-unit degradation}} \times \frac{\text{bitcontrol}}{\Delta OP} \times \text{control\_step\_function}$$

where the $\Delta deg_{measured}$ value is the measured change in degradation value, $\Delta OP$/per-unit degradation is the change in an operating point of the processor (e.g., voltage, frequency, or the like) per unit of degradation sensor output, bitcontrol/$\Delta OP$ is the per-unit change in control divided by the unit change in operating point, and control_step_function is a scaling function used to match the degradation to the control mechanism.

The degradation control mechanism then sets Deg0 equal to Deg1 (step 318) and waits for the next end to a predetermined interval to obtain a new Deg1 value (step 320) with the process proceeding to step 306 thereafter. If at step 314 the degradation control mechanism determines that the scale degradation factor is less than the control factor, the operation proceeds to step 320.

Returning to step 312, if at step 312 the degradation control mechanism determines that the $\Delta deg_{measured}$ value is less than zero, the degradation control mechanism determines whether the absolute value of the negative change in degradation value ($-\Delta deg_{measured}$) value causes the change in degradation (i.e., a scale degradation factor) to be greater than or equal to control degradation value (i.e., a control factor) (step 322) using the following equation:

$$\left| -\Delta deg_{measured} \frac{\Delta OP}{\text{per-unit degradation}} \right| \geq \frac{\Delta OP}{\text{bitcontrol}} \text{control\_step\_function}$$

where the $-\Delta deg_{measured}$ value is the negative measured change in degradation value, $\Delta OP$/per-unit degradation is the change in an operating point of the processor (e.g., voltage, frequency, or the like) for a given unit of the degradation sensor, $\Delta OP$/bitcontrol is the change in an operating point for a unit step change in the control setting for that operating point controller, and control_step_function is the step function used to determine the way the control is changed due to degradation.

If at step 322 the degradation control mechanism determines that the absolute value of the scale degradation factor is greater than or equal to the control factor, the degradation control mechanism determines a decrement value to decrement the operational parameter of the data processing system (step 324) utilizing the following equation:

$$\text{Decrement} = -\Delta deg_{measured} \frac{\Delta OP}{\text{per-unit degradation}} \times \frac{\text{bitcontrol}}{\Delta OP} \times \text{control\_step\_function}$$

where the $-\Delta deg_{measured}$ value is the negative measured change in degradation value, $\Delta OP$/per-unit degradation is the change in an operating point of the processor (e.g., voltage, frequency, or the like) per unit of degradation sensor output, bitcontrol/$\Delta OP$ is the per-unit change in control divided by the unit change in operating point, and control_step_function is a scaling function used to match the degradation to the control mechanism. After the degradation control mechanism determines a decrement value at step 324, the operation proceeds to step 318. Further, if at step 322 the degradation control mechanism determines that the scale degradation factor is less than the control factor, then the operation proceeds to step 320.

Figure 4:
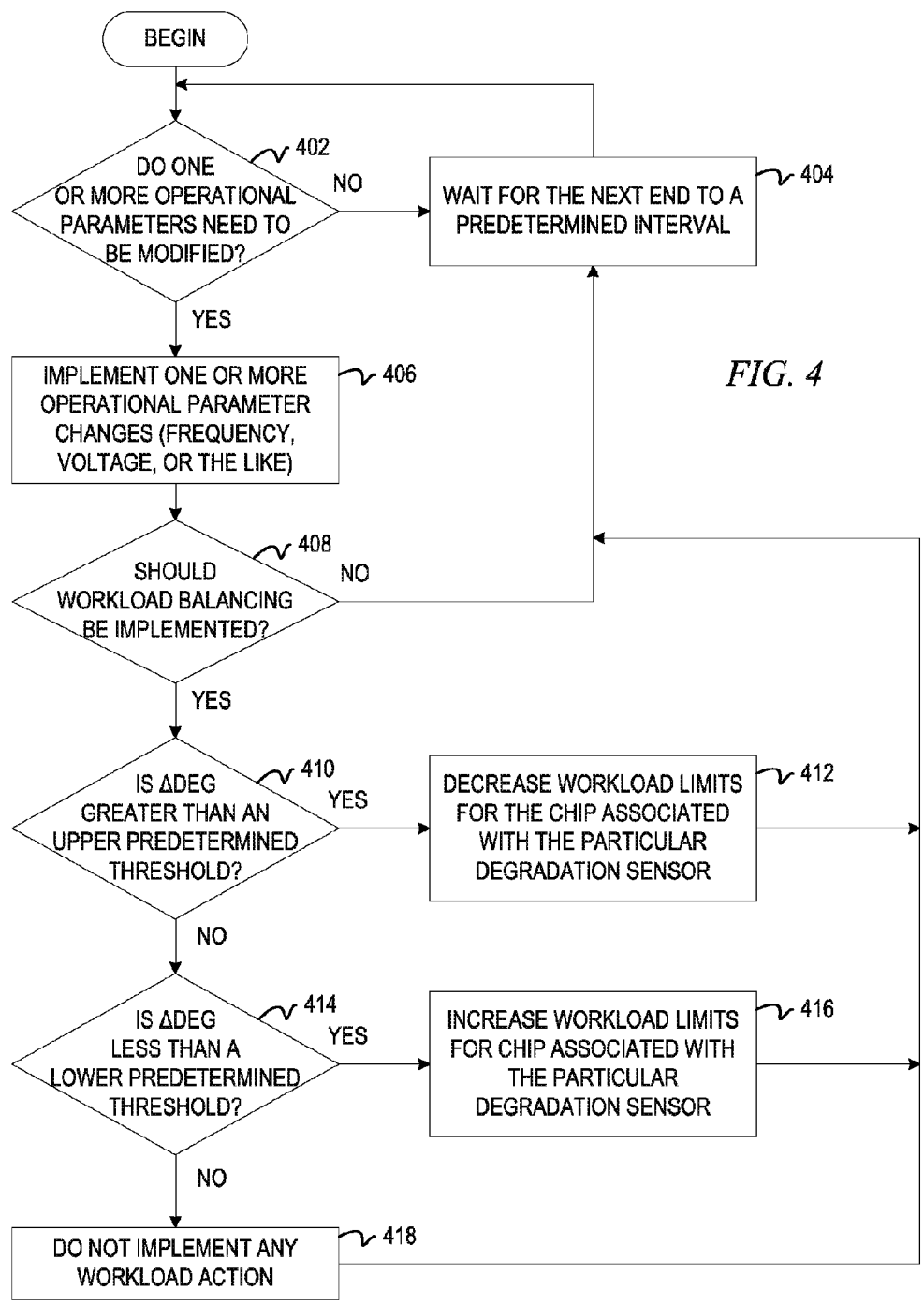
FIG. 4 depicts a flow diagram of the operation performed by a degradation control mechanism in implementing an operational parameter change within a data processing system in accordance with an illustrative embodiment.

FIG. 4 depicts a flow diagram of the operation performed by a degradation control mechanism in implementing an operational parameter change within a data processing system in accordance with an illustrative embodiment. As the operation begins, the degradation control mechanism determines whether one or more operational parameters needs to be modified based on one or more identified degradations (step 402). If at step 402 the degradation control mechanism determines that no operational parameter needs to be modified, the operation waits for the next end to a predetermined interval (step 404), with the operation proceeding to step 402 thereafter.

If at step 402 the degradation control mechanism determines that one or more operational parameters needs to be modified, the degradation control mechanism implements one or more operational parameter changes which may comprise one or more of introducing delays via a critical path monitor (CPM) circuit to a digital phase locked loop (DPLL) so that an effective frequency from the DPLL is lowered, reducing the calibration delay step size to the CPM in order to adjust the effective frequency, utilize the degradation change values to offset a voltage regulator module thereby increasing the timing margins, or the like which may comprise one or more of changing frequency parameters inside a digital phase locked loop (DPLL), applying a changed offset to the input of the DPLL, changing the effective delay in a critical path monitor circuit (CPM) to control the system frequency, changing an offset to a voltage regulator facility to control timing margins of the circuit, or the like (step 406). The degradation control mechanism also determines, based on a predefined setting, whether workload balancing should be implemented (step 408).

If at step 408 the degradation control mechanism determines that workload balancing should not be implemented, then the operation returns to step 404. If at step 408 the degradation control mechanism determines that workload balancing should be implemented, the degradation control mechanism determines whether the change in degradation value ($\Delta deg_{measured}$) is greater than an upper predetermined threshold (step 410). If at step 410 the degradation control mechanism determines that the $\Delta deg_{measured}$ value is greater than the upper predetermined threshold, then the degradation control mechanism decreases workload limits for the chip associated with the particular degradation sensor (step 412), with the operation returning to step 404.

If at step 410 the degradation control mechanism determines that the $\Delta deg_{measured}$ value is not greater than the upper predetermined threshold, the degradation control mechanism determines whether the $\Delta deg_{measured}$ value is less than a lower predetermined threshold (step 414). If at step 414 the degradation control mechanism determines that $\Delta deg_{measured}$ value is less than the lower predetermined threshold, then the degradation control mechanism increases workload limits for chip associated with the particular degradation sensor (step 416), with the operation returning to step 404. If at step 414 the degradation control mechanism determines that the $\Delta deg_{measured}$ value is not less than a lower predetermined threshold, then the degradation control mechanism may not implement any workload action (step 418), with the operation returning to step 404.

The $\Delta \text{deg}_{measured}$ value may be measured as the change in degradation since the last measurement or the instantaneous slope of the degradation. The $\Delta \text{deg}_{measured}$ value may also be calculated as the absolute degradation since initial operation by subtracting the current degradation, Deg1, from the initial degradation measured and stored during calibration. The comparison can then be made to a threshold of degradation for the given age of the device. Another mechanism is to calculate the longer term slope, i.e., average the most recent readings of Δdeg and compare it to a threshold of degradation allowed over a period of time. The choice of method is determined by what is most important for the system: absolute degradation or rate of degradation.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for retuning operational parameters based on active degradation measurements using available sensors such as frequency, voltage, throttling, timing-margin offsets, or the like, individually or in combination. The illustrative embodiments introduce a degradation control mechanism that may modify one or more operation values to in order to compensate for degradation shifts based on degradation change values determined between a first degradation value and a subsequent degradation value. The degradation control mechanism may compensate for degradation shifts by changing one or more operational parameters. For example, the degradation control mechanism may compensate for degradation shifts by one or more of changing frequency parameters inside a digital phase locked loop (DPLL), applying a changed offset to the input of the DPLL, changing the effective delay in a critical path monitor circuit (CPM) to control the system frequency, changing an offset to a voltage regulator facility to control timing margins of the circuit, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a data processing system, for implementing an operational parameter change within the data processing system based on an identified degradation, the method comprising:
   identifying one or more degradations existing in the data processing system based on a set of degradation values obtained from a set of degradation sensors;
   determining whether one or more operational parameters need to be modified based on the one or more identified degradations; and
   responsive to determining that the one or more operational parameters need to be modified based on the one or more identified degradations, implementing an input change to a one or more control devices in order that the one or more operational parameters are modified wherein the set of degradation values obtained from the set of degradation sensors are adjusted to match an identified characteristic of degradation using a control step_function and wherein the control_step function is at least one of a linear function, a non-linear function, a geometric function, or a logarithmic function.

2. The method of claim 1, wherein the input change is incrementing or decrementing one or more of frequency divider values within a digital phase locked loop (DPLL), changing a multi integral (mult_int) value within the DPLL, or changing a multi fractional (mult_frac) value within the DPLL, which in turn adjusts an operational frequency of the data processing system.

3. The method of claim 1, wherein the input change is either inducing one or more decrement signals to a offset register between critical path monitor (CPM) circuitry and a digital phase locked loop (DPLL) in order to slow down an operational frequency of the data processing system or inducing one or more increment signals to the offset register between the CPM circuitry and the DPLL in order to speed up the operational frequency of the data processing system.

4. The method of claim 1, wherein the input change is either to add delay to the calibration signal of critical path monitor (CPM) circuitry in order to slow down an operational frequency of the data processing system or to remove delay from the calibration signal of the CPM circuitry order to speed up the operational frequency of the data processing system.

5. The method of claim 1, wherein the input change is either to increase a voltage output by a voltage regulator module (VRM) in order to slow down an operational frequency of the data processing system or to decrease the voltage output by the VRM in order to speed up the operational frequency of the data processing system.

6. The method of claim 1, wherein the input change is to throttle instructions via critical path monitor (CPM) circuitry which causes undervolting logic to increase a voltage output by a voltage regulator module (VRM) until no throttling is measured and wherein, when no throttling is measured and at the end of a predetermined time interval, the undervolting logic reduces the voltage output by the VRM in order to return the data processing system to normal operation.

7. The method of claim 1, further comprising:
determining whether workload balancing should be implemented in response to one or more operational parameters needing to be modified based on the one or more identified degradations;
responsive to identifying that the workload balancing should be implemented, determining whether a determined degradation value ($\Delta deg_{measured}$) is greater than an upper predetermined threshold;
responsive to determining that the $\Delta deg_{measured}$ value is greater than the upper predetermined threshold, decreasing workload limits for a chip associated with a particular degradation sensor;
responsive to determining that the $\Delta deg_{measured}$ value is not greater than the upper predetermined threshold, determining whether the $\Delta deg_{measured}$ value is less than a lower predetermined threshold;
responsive to determining that $\Delta deg_{measured}$ value is less than the lower predetermined threshold, increasing the workload limits for the chip associated with the particular degradation sensor; and
responsive to determining that the $\Delta deg_{measured}$ value is not less than a lower predetermined threshold, not implementing any workload action.

8. The method of claim 7, wherein the determined degradation value is at least one of a rate of change in degradation since a last degradation reading or an absolute degradation since an initial degradation reading.

* * * * *